United States Patent [19]

von Linde et al.

[11] 3,997,299

[45] Dec. 14, 1976

[54] APPARATUS FOR PRODUCING PROTECTIVE GAS

[75] Inventors: Robert von Linde; Joachim von Linde, both of Graefelfing; German Kurz, Karlsfeld, all of Germany

[73] Assignee: Caloric Gesellschaft fur Apparatebau m.b.H., Graefelfing, Germany

[22] Filed: Apr. 11, 1975

[21] Appl. No.: 567,245

[30] Foreign Application Priority Data

Jan. 23, 1975 Germany .......................... 2502674

[52] U.S. Cl. .................................. 23/281; 261/109; 266/147; 266/156

[51] Int. Cl.$^2$ ........................ B01J 7/00; F27D 17/00

[58] Field of Search ................. 23/277 R, 281, 282; 55/255, 256, 350; 266/20, 29, 16, 17, 146, 147, 156; 137/252, 253; 261/109, 111, DIG. 9

[56] References Cited

UNITED STATES PATENTS

| | | | |
|---|---|---|---|
| 762,721 | 6/1904 | Hume | 137/253 |
| 3,088,812 | 5/1963 | Bitterlich et al. | 23/281 |
| 3,187,765 | 6/1965 | Frank et al. | 137/253 |
| 3,208,830 | 9/1965 | Knight et al. | 23/277 R X |
| 3,406,098 | 10/1968 | Humez et al. | 261/DIG. 9 |
| 3,764,123 | 10/1973 | Beggs et al. | 266/29 |

*Primary Examiner*—Morris O. Wolk
*Assistant Examiner*—Roger F. Phillips
*Attorney, Agent, or Firm*—Kane, Dalsimer, Kane, Sullivan & Kurucz

[57] ABSTRACT

Apparatus for producing protective reducer gas, for use in plant having main and auxiliary burners for burning liquid or gaseous fuels, and designed either for heating purposes or for ore reduction processes. The apparatus includes a common cooling chamber into which the hot waste gases from the main and/or auxiliary burners can be fed selectively, the auxiliary burner being located immediately above the chamber with a combustion pipe extending downwards into the cooling chamber. Cooling water is injected directly into the upper part of the cooling chamber and withdrawn from the lower end. The waste gases from the main burner are admitted through a pipe terminating between the levels of two outlets in a side wall of the cooling chamber, the lower one having a valve closure, to control the level of the cooling water and so form a water seal for the waste gas inlet. The protective gas outlet is in the upper part of the cooling chamber.

3 Claims, 2 Drawing Figures

APPARATUS FOR PRODUCING PROTECTIVE GAS

This invention relates to protective gas plant for equipment having a main burner for liquid or gaseous fuels, for heating a liquid or gaseous medium, or particularly for equipment for carrying out ore reduction processes, in which protective gas is generated by cooling of hot waste gases emanating alternatively from the main burner or from an auxiliary burner.

Such protective gas plants are necessary inter alia for equipment for carrying out ore reduction processes in which for example iron has to be safeguarded by protective gas against oxidation both during its production and also during subsequent storage. During production of the spongy iron, the protective gas can be obtained from the waste gases from a main gas or oil burner used in the reduction process to produce the reduction gas, these waste gases being cooled, water being extracted from them, and their temperature lowered. During operation of the reduction plant, this protective gas can naturally also be used to safeguard the storage. The reduction plant may not be continuously in operation, but on the other hand protective gas must be constantly available for the storage chamber, and therefore a separate protective gas production plant with an oil or gas burner is provided, for the production of protective gas when the reduction plant is inoperative, the waste gases from the burner being cooled and so converted to protective gas by the extraction of water and a lowering of their temperature. The cost of such a protective gas plant is considerable, particularly since the pipe carrying the protective gas during operation of the reduction plant must be hermetically sealed off during operation of the auxiliary protective gas producer. Having regard to the high temperature of over 1000° C, the large-diameter of this pipe and the fact that, by reason of its connection to a chimney, a vacuum prevails in this pipe when the ore reduction plant is inoperative, this is a problem which is difficult to resolve.

The general object of this invention is to provide a protective gas plant of the type mentioned above, which is of substantially lower cost.

Broadly stated the invention consists in protective gas plant for equipment having a main burner for liquid or gaseous fuels, for heating a liquid or gaseous medium, or for equipment for carrying out ore reduction processes, in which protective gas is produced by the cooling of hot waste gases which emanate selectively from the main burner or from an auxiliary burner, including a cooling chamber operating with direct water cooling and common to both streams of waste gases, and to which are connected a pipe carrying waste gases from the main burner, a pipe carrying waste gases from the auxiliary burner, and a protective gas discharge pipe, a cooling water supply in the upper zone of the cooling chamber, and an outlet for the heated cooling water in the lower zone of the cooling chamber, a shut-off device being provided for the pipe supplying the waste gases from the main burner.

By use of a cooling chamber common to both streams of waste gases, the invention offers a substantial simplification over known protective gas plants which have protective gas producers and cooling equipment completely separated from one another. By reason of the fact that the pipe carrying the waste gases from the main burner projects into the cooling chamber, this part of this pipe is kept intensively cooled by the cooling water, so that the otherwise necessary lining of this pipe in this region may be dispensed with, and a relatively simple, likewise water-cooled shut-off device can be provided.

This shut-off device is preferably constructed in the form of a water seal using the cooling water as the sealing water, the pipe carrying the waste gases from the main burner extending substantially vertically downwardly within the cooling chamber and an apparatus being provided which controls the level of the sealing water so that, when necessary, the mouth of the said pipe can be allowed to dip into the sealing water. In order to control the level of the sealing water, two outlets may be located in the cooling chamber at different heights, the lower of which has a shut-off device, while the pipe carrying the waste gases from the main burner ends between the levels of the two outlets. When the main burner is out of operation and when the protective gas is to be produced by the auxiliary burner, it is necessary only to actuate the said shut-off device, so that the level of water in the cooling chamber rises until the end of the pipe carrying the waste gases is immersed in the water, the vertical length of this portion of the pipe being naturally so selected that the cooling water is not sucked back by any negative pressure existing in this pipe or is conveyed back by the pressure of the waste gases from the auxiliary burner.

The pipe carrying the waste gases from the auxiliary burner preferably also acts as the combustion chamber for the auxiliary burner, which projects from above into the cooling chamber and which is surrounded by cooling water nozzles or filling elements on which cooling water is sprinkled. In this way, an extraordinary compact construction is provided, with good ceiling of the combustion chamber of the auxiliary burner.

For reasons of saving space, it is expedient for the pipe carrying the waste gases from the auxiliary burner to enter the cooling chamber horizontally and then to be bent downwardly at right-angles. With this arrangement and with the combustion chamber of the auxiliary burner projecting from above downwardly into the cooling chamber, in order to protect that part of the pipe carrying the waste gases from the main burner which extends into the cooling chamber, against the hot gases from the auxiliary burner, a baffle plate for the waste gases, may be provided at a distance from the open end of the combustion chamber, this baffle plate being cooled by the cooling water. This baffle plate protects not only the pipe but it additionally deflects the gas stream upwardly, in other words in the direction of the cooling water supply and the protective gas discharge pipe.

In the cooling chamber, additional conducting means may be provided to carry the cooling water to portions of the pipes carrying the waste gases which are particularly susceptible to heat.

The invention may be performed in various ways and one specific embodiment will now be described by way of example with reference to the accompanying drawings, in which.

Figure 1:
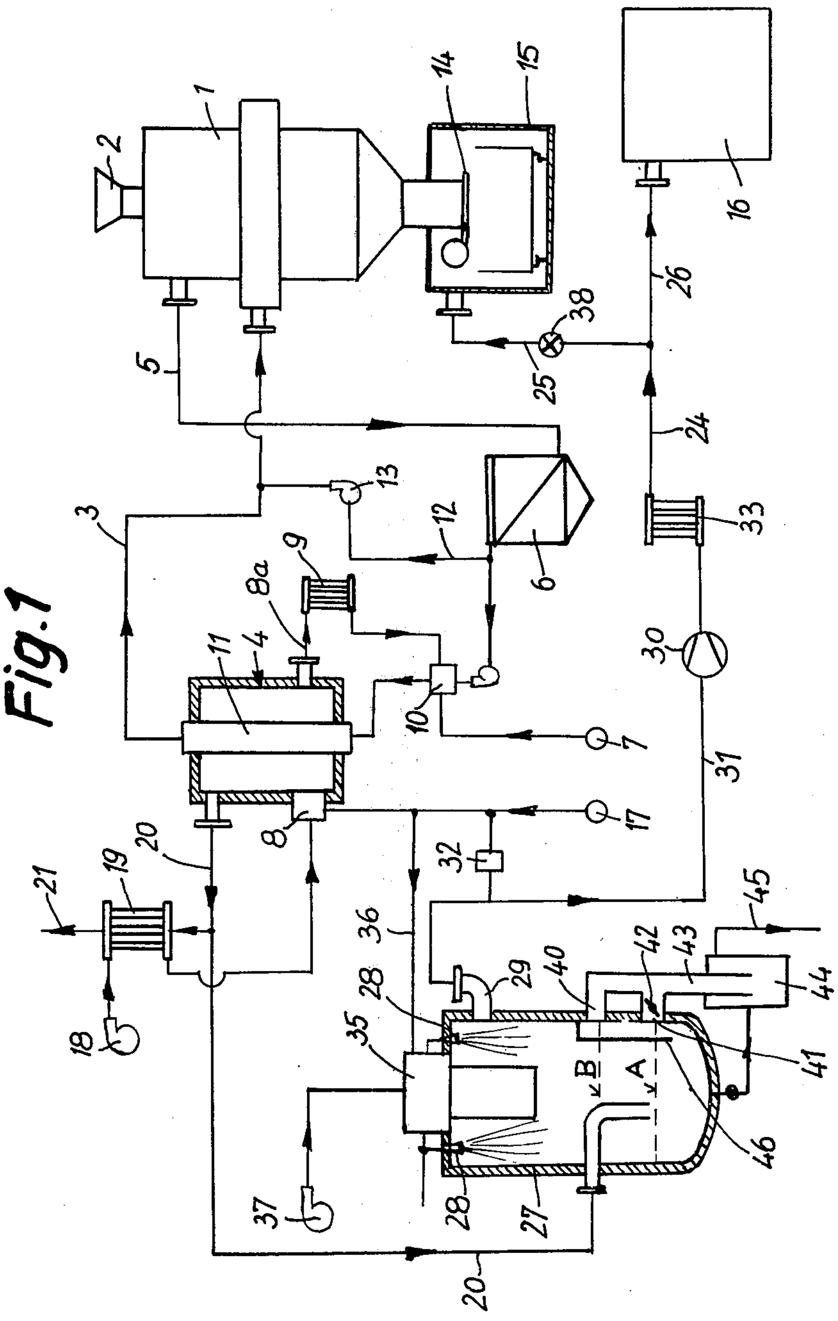
FIG. 1 is a diagram of an apparatus for the direct reduction of iron ore with a protective gas plant according to the invention.

Reference is made firstly to FIG. 1 which illustrates a plant for the direct reduction of iron ore, in which iron oxide is reduced by carbon monoxide to spongy iron and in which the waste gas arising during reduction is used for the conversion of for example natural gas into reduction gas.

Reference numeral 1 denotes the reduction furnace into which iron oxide is filled through a funnel 2. Through the pipe 3, a reducing gas which is produced in a recuperatively operated gas converter 4 from a mixture of gases is introduced into the reduction furnace. The gas mixture is composed of a part of the reduction waste gas flowing back from the reduction furnace 1 through the pipe 5 and treated in the gas-cooling and cleansing chamber 6, natural gas supplied by a source 7 of natural gas, and a part of the waste gases from a main burner 8 which heats the gas converter 4. These waste gases are fed through a pipe 8*a* and a cooler 9 to a mixing chamber 10 in which these waste gases are blended with the first-mentioned waste gases and with the natural gas. The gas mixture is fed through pipe 11 filled with catalyst in the gas converter 4 and heated by the main burner 8 to a temperature of approximately 900° C, the waste gas being converted into an effective reducing gas. The hot reducing gas emerging from the gas converter 4 is brought to a constant temperature by admixture of a part of the cooled and cleansed reduction waste gases through the pipe 12 and the blower 13, before it enters the reduction furnace 1. The spongy iron produced in the reduction furnace 1 drops over a flap 14 into a hermetically sealed receiving container 15 and, in a manner not shown, is fed to a diagrammatically indicated storage container 16, whence the spongy iron passes directly to an electric steel works to be processed into steel.

The main burner 8 which operates the gas converter 4 is a gas or oil burner which obtains its fuel from a gas source or an oil tank 17. A blower 18 conveys the combustion air through an air pre-heater 19 to the main burner 8. The air pre-heater 19 is operated by the hot waste gases from the main burner 8 which are carried away through the gas pipe 20 and which flow in part through the air pre-heater 19 before escaping into the atmosphere through a chimney at 21.

The spongy iron produced in the iron furnace 1 is extraordinarily compatible with oxygen and must therefore be protected against oxidation both during its production and also during its transportation and storage. For this purpose, a protective gas plant is provided which produces protective gas, feeding it through a pipe 24, and either through a pipe 25 to the container 15, and/or through a pipe 26 to the storage container 16. While the ore production plant is operating, which pre-supposes the production of reducing gas in the gas converter 4 and thus operation of the main burner 8, the protective gas is obtained from the hot waste gases from the main burner 8 which are fed to a cooling chamber 27 through the pipe 20. In the cooling chamber 27, the hot waste gases are sufficiently cooled by direct water cooling brought about by water-spray nozzles 28 disposed at the other end of the cooling chamber 27, that the $H_2O$ contained in the waste gases becomes for the most part condensed. The substantially water-free waste gas is extracted by a blower 30 through a discharge pipe disposed in the upper part of the cooling chamber 27 and fed to the pipe 24. In order to avoid condensate forming in the portion of pipe 31 between the discharge pipe 29 and the blower 30, the temperature of the productive gas can, according to the ambient temperature, be raised by burning-in natural gas, using a burner 32. Provided in the pipe 24 is a cooler 33 in which the compression heat of the blower 20 is dissipated out of the protective gas to cooling water.

When the ore reduction plant is not operating, no waste gas from the main burner 8 is available for the production of protective gas which, even when the plant is inoperative, is required for other purposes, for example for protecting at least the store 16. In this case, the protective gas is produced from the waste gases from an auxiliary burner 35 which, like the main burner 8, is constructed as a gas or oil burner, obtaining its fuel from the gas or oil source 17 through a pipe 36. The combustion gas is conveyed by a blower 37. The waste gases from the auxiliary burner 35 are introduced directly into the cooling chamber 27 where, as in the case of the waste gases from the main burner 8, they are cooled by direct water-cooling to approximately 40° C, resulting in substantially water-free protective gas which, in the manner previously described, is fed to the protective gas pipe 24 by the blower 30. In this case, a valve 38 can shut off the pipe 25 to the container 15 so that the protective gas produced can be fed solely to the storage container 16.

When the ore reduction plant is out of operation, and when therefore the necessary protective gas is being produced solely from the waste gases from the auxiliary gas burner 35, the waste gas pipe 20 from the main burner 8 must be shut off as otherwise the protective gas produced from the waste gases from the auxiliary burner 35 could at least partially flow through this pipe 20 and the pipe 21 into the chimney. Sealing-off this pipe 20 can be achieved particularly easily if, in accordance with the example of embodiment illustrated, this pipe 20 projects into the cooling chamber 27, a shut-off device in the form of a water seal being provided for this pipe, the cooling water being used as the sealing water. For this purpose, the pipe 20 extends inside the cooling chamber 27 and substantially vertically downwardly, and to regulate the level of the sealing water, there are disposed at different heights on the cooling chamber 27 two outlets 40 and 41, of which the lower outlet 41 has a shut-off device 42. The outlets 40 and 41 discharge into a common outlet pipe 43 which enters a receiving vessel 44 from which the cooling water is discharged at 45. A separating wall 46 prevents the waste gas being able to flow out directly through one or both outlets 40, 41.

When the main burner 8 is operating, the shut-off device 42 is open and in the cooling chamber the cooling-water level A allows the waste gases free access from the pipe 20 into the cooling chamber 27. When the auxiliary burner 35 is operating, the shut-off device 42 is actuated, so that in the cooling chamber 27 the cooling-water level is at B, so that the pipe 20 is sealed off. The height of the vertical portion of the pipe 20 inside the cooling chamber 27 is thereby so dimensioned that the cooling water cannot be sucked back or forced in over the highest point of the pipe 20 either by the negative pressure obtaining in the pipe 20 due to the chimney draught nor by the pressure of the waste gases from the auxiliary burner 35.

Figure 2:
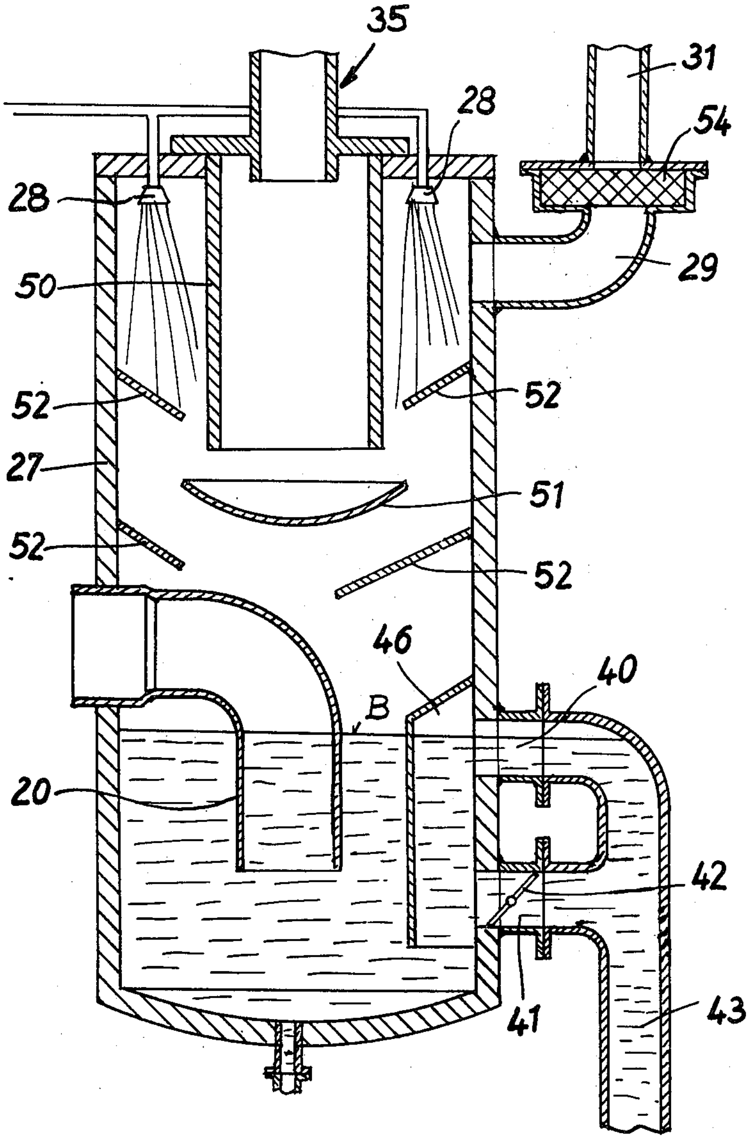
FIG. 2 is a diagrammatic sectional elevation showing the essential parts of a protective gas plant according to the invention, on an enlarged scale.

The cooling chamber 27 with the auxiliary burner 35 and the water seal for the pipe 20 is shown in detail in FIG. 2. The combustion chamber 50 of the auxiliary burner 35 projects directly from above into the cooling chamber 27. The combustion chamber 50 is effectively cooled on its outer surface by the cooling water which is fed through the spray nozzles 28 at the upper end of the cooling chamber into the annular space between the combustion chamber 50 and the cooling chamber 27. Below the end of the combustion chamber 50 and at a distance therefrom there is a concave baffle plate 51 for the waste gases emerging from the combustion chamber 50. This plate 51 deflects the waste gases towards the jets of water emerging from the nozzles 28 and in the direction of the protective gas discharge pipe 29. Furthermore, this plate 51 safeguards the pipe 20 against the hot waste gases. Provided in the cooling chamber are guide means 52 which assist in conducting the flow of cooling water along parts which are particularly susceptible to heat, in other words particularly the combustion chamber 50, the baffle plate 51 and the pipe 20.

A moisture separator (demister) 54 is provided in the protective gas discharge pipe 29.

Many alternative forms of this described embodiment are possible without departing from the scope of the invention. For example, instead of the spray cooling illustrated, using spray nozzles, it is possible to provide in the annular space between the combustion chamber 50 and the wall of the cooling chamber 27 filling elements which are sprinkled with cooling water. Instead of the illustrated water seal for the pipe 20, it is also possible to provide inside the cooling chamber 27 a gate valve in the pipe 20, which would thus be water-cooled.

The protective gas plant according to the invention is not restricted to use in apparatus for carrying out ore reduction processes. A further field of application is for example the generation of protective gas in oil tankers, where the oil tanks are placed under protective gas in order to diminish the risk of explosion. Normally the protective gas is obtained from the waste gas from an oil burner which is used to produce water vapour to operate steam turbines to drive giant valves and the like. Since this main burner is not always in operation or may even fail, it is desirable to provide an auxiliary burner from the waste gases of which protective gas can be produced if necessary. Finally, the invention can also be applied to plants for gas reforming, in which gas or oil burners are needed to carry out the processes, the waste gases from which are then converted to protective gas.

What we claim is:

1. Apparatus for producing protective gas in combination with equipment for carrying out ore reduction processes, comprising; a protective gas generator having a chamber, a burner mounted upon said chamber and having a combustion chamber projecting from above into said chamber, means for injecting cooling water into the hot waste gases within said chamber, said means being arranged above the lower end of said combustion chamber, a discharge pipe for the cooled waste gases extending from said chamber above the lower end of said combustion chamber, a liquid outlet for the heated cooling water in the lower part of said chamber, and further comprising a main burner, a main pipe carrying waste gases from said main burner to said chamber and extending substantially vertically downwardly within said chamber and opening in the lower part thereof and below said liquid outlet, a second liquid outlet below the opening of said main pipe and a shut-off device associated with said second liquid outlet.

2. Apparatus according to claim 1, including a baffle plate for the waste gases located below and spaced from the open bottom end of said combustion chamber, this baffle plate being mounted within said cooling chamber and cooled by sealing water, the baffle plate being arranged between the lower end of the combustion chamber and the main pipe to protect the latter from the waste gases emerging from the combustion chamber.

3. Apparatus according to claim 1, including guide means in said cooling chamber for conducting the cooling water toward the outlets of said pipes carrying the waste gases.

* * * * *